United States Patent [19]
Rosset

[11] Patent Number: 5,499,493
[45] Date of Patent: Mar. 19, 1996

[54] FRUIT HARVESTER

[76] Inventor: René R. Rosset, 28 Braewood Place, Winnipeg, Manitoba, Canada, R3R 2T1

[21] Appl. No.: 303,011

[22] Filed: Sep. 8, 1994

[51] Int. Cl.⁶ .................................................. A01D 46/00
[52] U.S. Cl. .................... 56/13.3; 56/330; 56/331
[58] Field of Search .................... 56/12.9, 13.3, 56/330, 331, 31, 32

[56] References Cited

U.S. PATENT DOCUMENTS

| | | |
|---|---|---|
| 924,552 | 6/1909 | Holmes . |
| 2,459,471 | 1/1949 | Tebbetts ..................................... 56/330 |
| 2,544,443 | 3/1951 | Brateng ...................................... 56/330 |
| 2,607,180 | 8/1952 | Stankavich et al. ...................... 56/330 |
| 2,696,706 | 12/1954 | Getsinger ................................. 56/330 |
| 2,732,677 | 1/1956 | Nielsen ..................................... 56/330 |
| 2,915,871 | 12/1959 | Furford ..................................... 56/330 |
| 3,623,309 | 11/1971 | Stang et al. .............................. 56/330 |
| 3,720,050 | 3/1973 | Rozinska .................................. 56/330 |
| 3,720,051 | 3/1973 | Quick ........................................ 56/330 |
| 3,760,573 | 9/1973 | Porter .................................. 56/12.9 X |
| 4,928,459 | 5/1990 | Thedford et al. ......................... 56/13.3 |
| 5,076,047 | 12/1991 | Rosset ....................................... 56/330 |
| 5,094,064 | 3/1992 | Thedford ................................ 56/32 X |
| 5,259,177 | 11/1993 | Windmuller et al. ..................... 56/330 |

Primary Examiner—George A. Suchfield
Attorney, Agent, or Firm—Adrian D. Battison; Murray E. Thrift

[57] ABSTRACT

A picking system for cranberries or similar small berries carried on vines lying across the ground includes a plurality of tines arranged as an array across the picking system transverse to the direction of movement. The tines include a vertical portion, a curved section and a horizontal front portion projecting forwardly. The tines are reciprocated by a cam action behind the vertical portion. Each tine has a vertical slot along its center line through which passes a stationary blade with a hooked upper end so that the movement of the tine provides a scissors action with the stationary blade. A suction duct is positioned directly above the horizontal front portion to draw the collected berries vertically upwardly for collection. An air jet nozzle is positioned at the front of the suction duct with an air jet projecting downwardly and rearwardly to hold berries onto the horizontal portion.

19 Claims, 4 Drawing Sheets

FRUIT HARVESTER

BACKGROUND OF THE INVENTION

This invention relates to a fruit harvester which is particularly but not exclusively designed for harvesting small berries such as cranberries which grow on vines lying across the ground.

One example of a harvester of this general type is shown in U.S. Pat. No. 5,076,047 of the present inventor and the present application is directed to a number of improvements over this device which are designed to improve the picking process.

The above patent discloses an arrangement including a plurality of forwardly extending tines which are oscillated so that the tines move substantially vertically at their forward ends to lift the berries away from the vine. A suction duct is positioned above the tines and provides an open mouth from which duct extends vertically. The berries separated from the vine are thus sucked away by the vertical suction duct and carried to a container. It has been found that this arrangement, while generally satisfactory, has a number of disadvantages. Firstly the vertical movement of the tines is unsatisfactory and provides an excessive pulling force on the vines. Secondly, transverse vines remain looped over the tines and are thus pulled by the forward movement of the tines. This can lead to excessive pulling force on the roots of the vines tending to rip the vines from the ground and cause damage to the plant. Furthermore, the berries can roll forwardly of the tines at locations where the number of berries is reduced due to a bare spot in the vine so that the berries can simply roll beyond the front end of the tines and are lost to the ground.

Further examples of harvesters of this general type are shown in U.S. Pat. Nos. 3,623,309 (Stang), 2,607,180 (Stankavich), 924,552 (Holmes), 2,544,443 (Brateng), 2,696,706 (Getsinger), 2,732,677 (Nielsen), 2,915,871 (Furford) and 2,459,471 (Tebbetts).

Furford discloses a device of this general type including a cutting knife arrangement with a blade reciprocated by an eccentric lever action within a cutting tube. The blade cooperates at a lower end with a slot in the tube and with a raised fin along the top of a horizontal tine. This picking action is unsatisfactory in that the tines do not provide an effective separation of the fruit from the vines. The cutting action of the sliding blades is complex and mechanically inefficient.

Tebbets discloses a device of this general type including an inclined duct above inclined tines with edge nozzles positioned within the duct so as to push the fruit up the incline defined by the tines to move the fruit to the rear within a suitable container. The edge nozzles are used simply to roll the fruit along the inclined duct and uses a replacement for a vacuum system. This arrangement is unsatisfactory in that it requires a machine which is very low with the container immediately rearward of the inclined tines. This significantly reduces the capacity and interferes with the location of the operator.

SUMMARY OF THE INVENTION

It is one object of the present invention, therefore to provide an improved harvester of this general type in which the movement of the tines is arranged to provide an improved lifting action of the berries from the vines.

It is a further object of the present invention to provide a harvester of this general type in which there is included an effective cutting system for cutting transverse vines without excessive pulling action on the vines.

It is a yet further object of the present invention to provide an improved harvester of this type which includes a suction duct and includes an improved air system for controlling the movement of the berries in the area of the picking action.

According to a first aspect of the invention there is provided a harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said mounting means being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tine to lift the berries from the tines for transportation to collection means, each tine including a substantially vertical portion extending upwardly from said rearward portion and substantially at right angles to said generally horizontal forward portion.

The shape of the tines including the vertical portion allows the roller to be positioned immediately rearwardly of the forward portion of the tine to prevent undue pulling of the vines and allows the forward portion to be adjusted downwardly close to the ground to act upon vines which are low to the ground.

According to a second aspect of the invention there is provided a harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said mounting means being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tines to lift the berries from the tines for transportation to collection means, and a plurality of stationary blade members, each arranged to cooperate with a respective one of the tines such that movement of the respective tine causes a cutting action of the blade relative to the tine for cutting vines lying across the tine.

According to a third aspect of the invention there is provided a harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said mounting means being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tine to lift the berries from the tines for transportation to collection means, a tubular suction duct having an open mouth arranged vertically above the forward portion of the tines with the duct extending upwardly therefrom and an air-jet nozzle arranged at the open mouth above the forward portion of the tines, the air-jet nozzle being arranged to generate an air jet directed downwardly and rearwardly onto the forward portion of the tines.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The present invention is concerned only with the picking system of the harvester and hence the remainder of the vehicle on which the picking system is carried is not shown. A suitable design for the vehicle will be apparent to one skilled in the art and in addition one example of a vehicle suitable for this purpose is shown in the above mentioned U.S. Pat. No. 5,076,047 on the present inventor, to which reference is made herein.

The picking system basically comprises a plurality of tines mounted in a tine array 10, a suction duct 11, a stationary blade assembly 12 and a vine roller 13.

Figure 2:
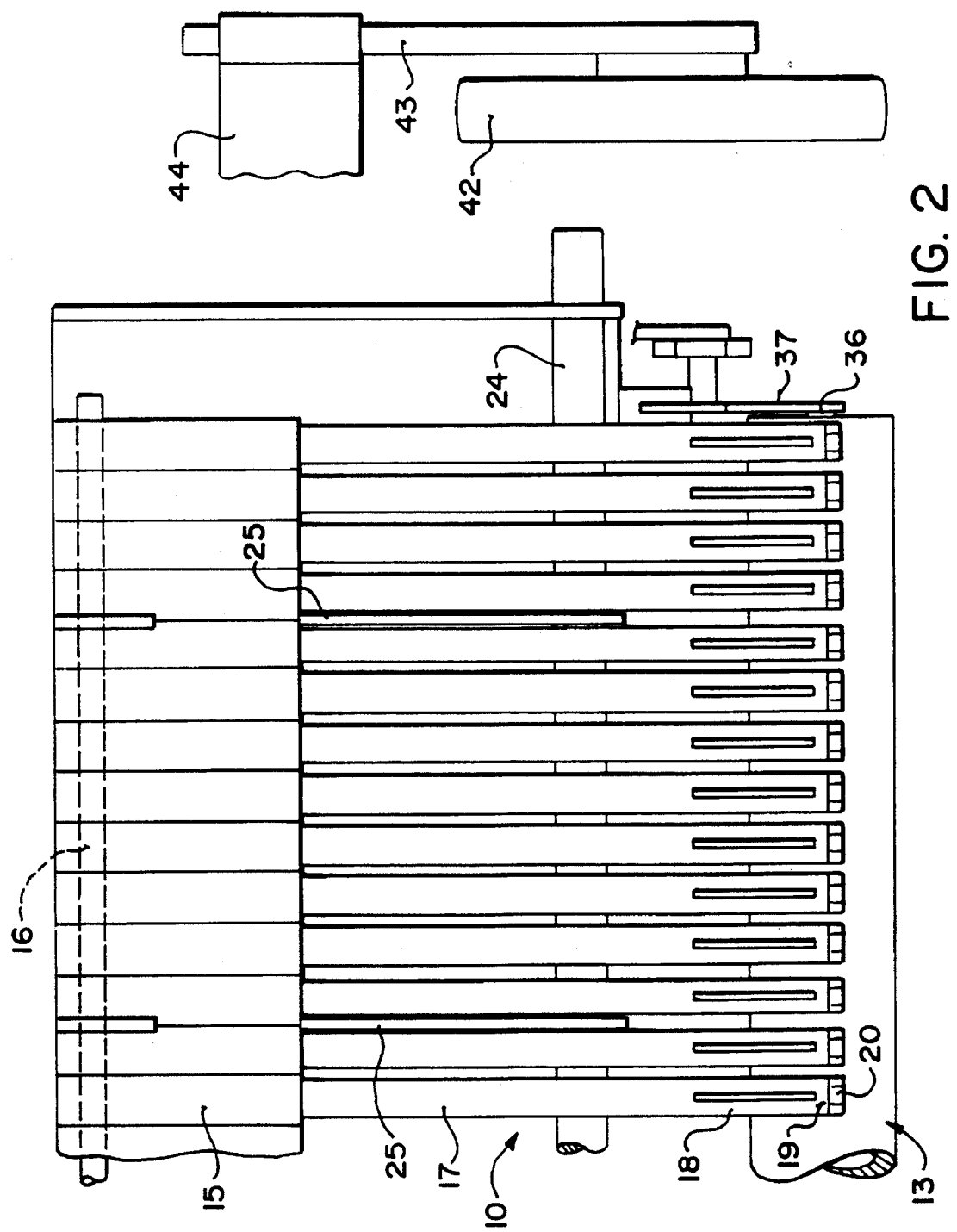
FIG. 2 is front elevational view of one part of the harvester of FIG. 1 with the suction duct removed for convenience of illustration.
Figure 4:
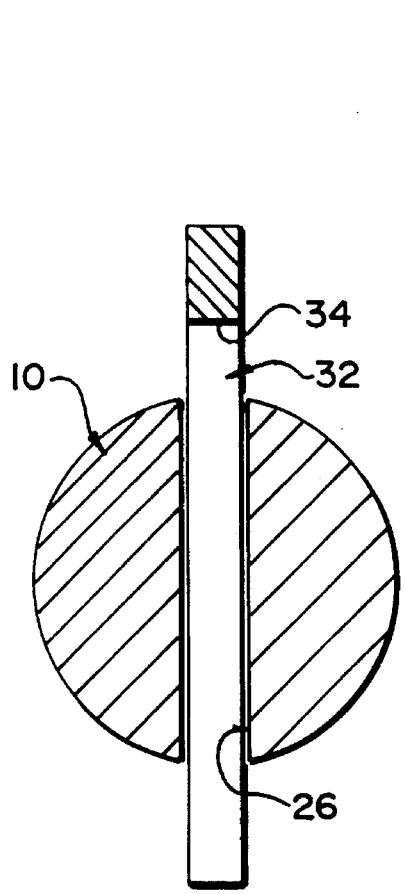
FIG. 4 is a cross-sectional view along the line 4—4 of FIG. 3.

The tine array 10 comprises a plurality of tines arranged side by side in a row transversely of a direction 14 of working movement of the harvester. Each tine comprises an upper holder portion 15 mounted for pivotal movement about a single transverse shaft 16 at a position raised from the ground and at the top of the holder 15. Each tine further includes a vertical tine portion 17 which extends downwardly from a bottom edge of the holder 15, a curved rear tine portion 18 which extends from the lower end of the vertical portion 17 downwardly and forwardly while curving smoothly to a horizontal orientation at the forward end thereof and finally a horizontal front tine portion 19. The holders 15 are generally square in horizontal cross section and are arranged side by side in abutting relationship so that the sides of the square block forming the holder define bearing surfaces for movement of the tines about the shaft 16. The tines, as best shown in FIG. 2 are narrower than the holders 15 and extend therefrom at a constant width through the portion 17, 18 and 19. However the height of the tines gradually decreases from the forward end of the curved portion 18 to a front edge 20 of the tine. The tines are cast from suitable material such as aluminum which provides sufficient structural strength in a rigid tine structure which is relatively light in weight.

Figure 3:
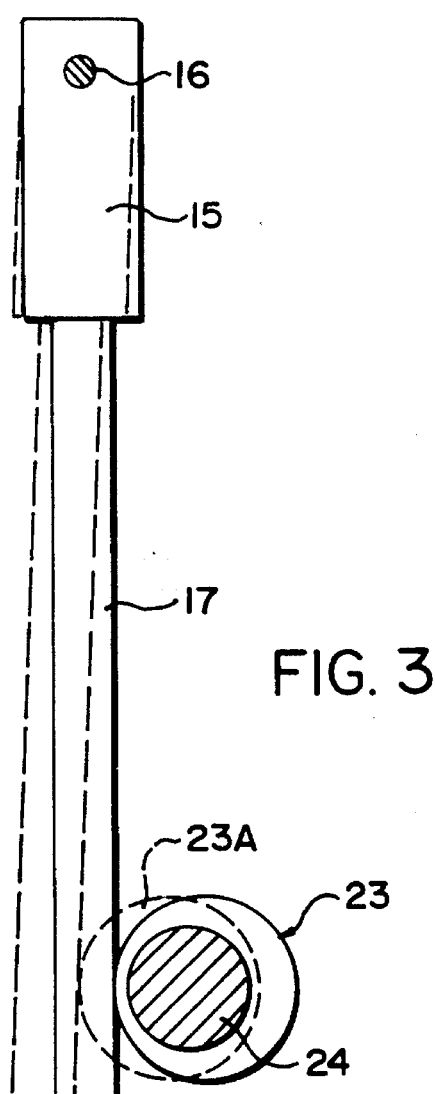
FIG. 3 is a side elevational view of one tine only of FIG. 1.

Each tine is spring biased in a counterclockwise direction by a coil spring 21 which pulls the tine into engagement with a cam surface 22 of an eccentric cam 23 mounted on a shaft 24. The shaft extends transversely across the tine array rearwardly of the tine and is carried on a plurality of bearing support plates 75 at spaced positions across the tine array. Each tine has a separate cam member carried on the shaft so the rotation shaft causes the eccentric cam member to push the vertical portion of the tine forwardly and rearwardly in pivotal action about the shaft 16. The action of the cam member 23 is shown in FIG. 3 where the forward position of the cam member is indicated at 23A showing that the cam acts in a horizontal direction forwardly and rearwardly on the respective tine. The tine is thus moved basically forwardly and rearwardly but in addition there is a slight vertical component due to the pivotal movement about the shaft 16. This causes the forward end or nose of the tine to move forwardly but also to move slightly upwardly so that the forward movement is of the order of 1 to 2 inches and the vertical is less than 0.5 inches. The width of the tines is preferably of the order of 1.25 inches with the width of the holders of the order of 1.5 inches thus leaving a space between the tines of the order of 0.25 inches.

An air jet nozzle 25 is located adjacent the point of contact between the rear surface of the tines and the cam member 23 so as to direct a jet of cleaning air 26 between the cam member and the tines. This ensures that any vegetable matter, dust or the like is cleared away from the contact point to prevent blockages forming and to prevent excessive wear. It is also possible to add to the air jet a mist of lubricant carried by the air jet to yet further reduce wear.

Figure 5:
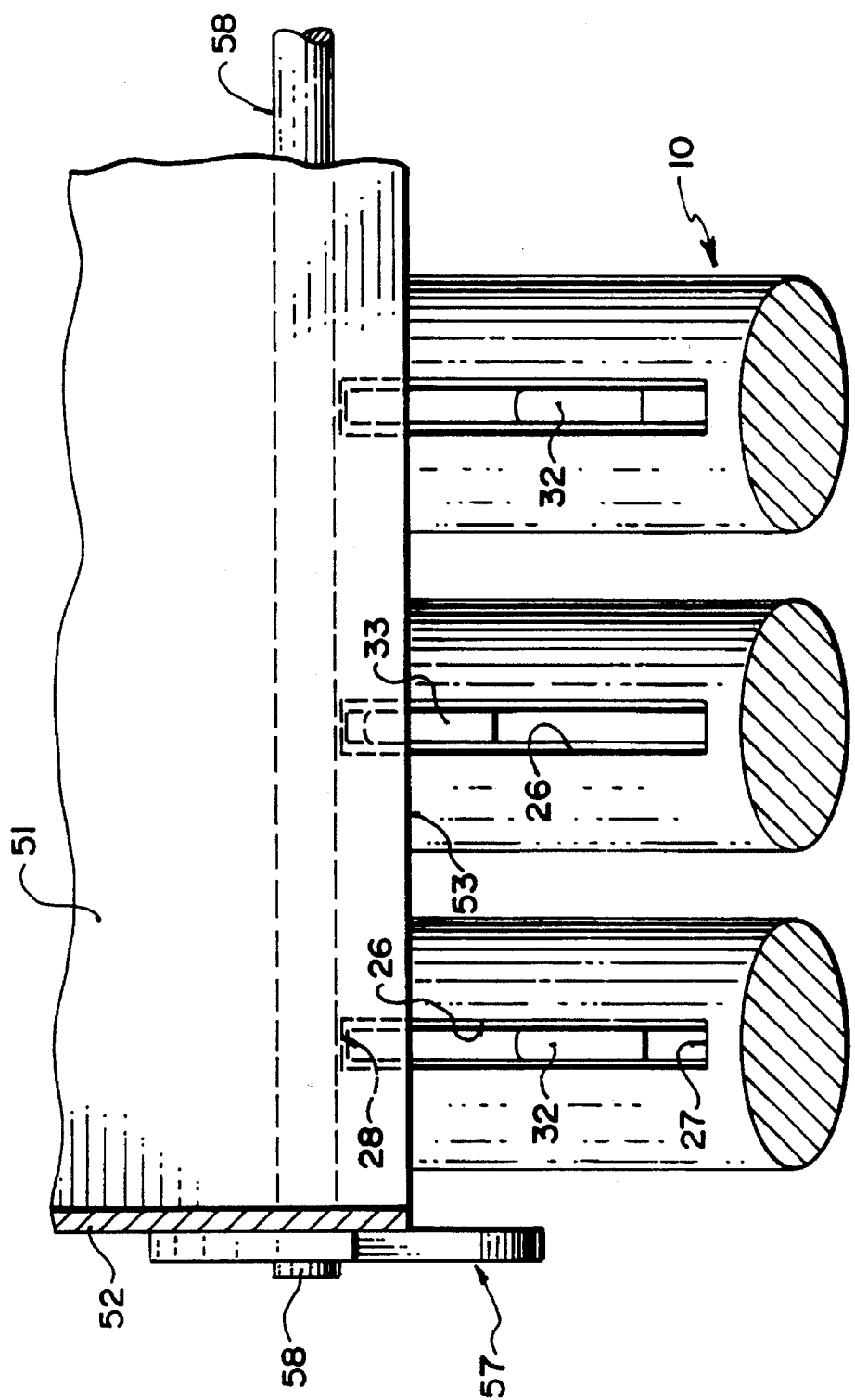
FIG. 5 is a cross-sectional view along the line 5—5 of FIG. 1.

Each tine includes a longitudinal slot 26 which extends from a forward end 27 to a rearward end 28 of the slot. The slot lies in a vertical plane along a centre line of the tine. The tines are identical so that the slots are aligned as best shown in FIG. 5.

Figure 1:
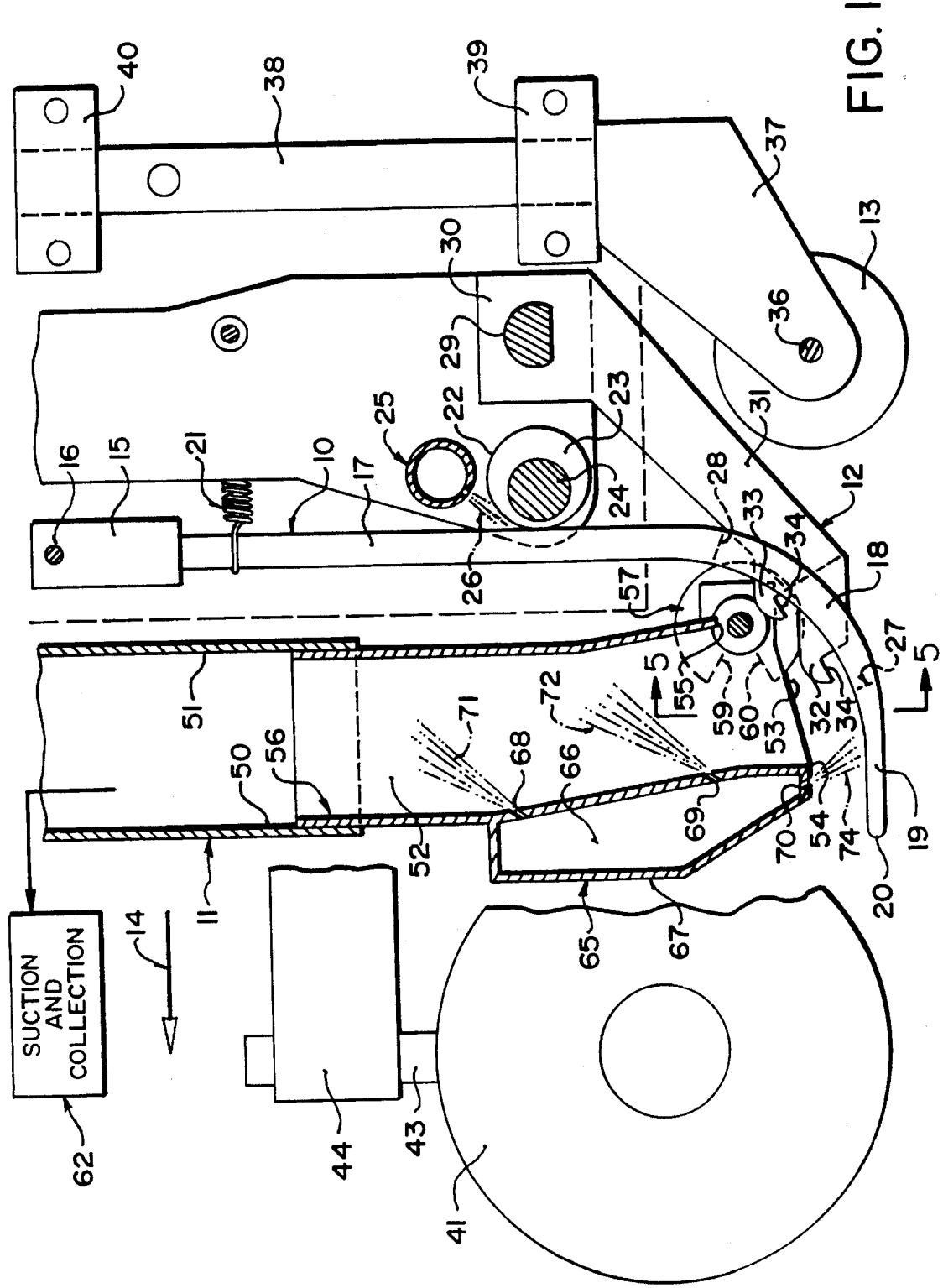
FIG. 1 is a vertical longitudinal cross-sectional view through a harvester according to the invention.

Each tine cooperates with a respective one of the blades 12. Each blade comprises a blade plate lying in a vertical plane and mounted on a support shaft 29 positioned rearwardly of the shaft 24. Thus each blade includes a first portion 30 engaged around the shaft 29 and a forwardly and downwardly extending portion 31 which extends from the upper portion 30 to a position just rearward of the slot 26. At a forward end of the inclined portion 31 is provided a hook member 32, 33 which projects upwardly from the forward end of the inclined portion through the slot 26 in a respective one of the tines. As will be apparent from comparison from FIGS. 1 and 5, the hook members 32 and 33 are arranged in two rows. Thus the hook portion 32 of alternate ones of the tines are arranged forwardly adjacent the front edge 27 of the slot and intervening ones 33 of the hook members are positioned rearwardly adjacent the rear edge 28 of the slot.

Each hook member includes an under surface 34 which is inclined downwardly and forwardly in a direction generally parallel to the adjacent portion of the upper surface of the tine. This allows a vine to be engaged under the hook member against the undersurface 34. In the rearward normal position of the tine, the hook member is projected upwardly above the upper surface of the tine. However the tine is moved forwardly and slightly upwardly by the cam action, the upper surface of the tine at the slot moves upwardly relative to the stationary hook member to pinch the vine 35 in a cutting action. The stationary blade has a width slightly less than that of the slot so that the side edges of the blade cooperate with the side surfaces of the slot in sliding cutting action. It is thus the movement of the tine relative to the stationary blade that causes the cutting action. Any vines thus sliding rearwardly over the upper surface of the tines engages into either a forward one 32 of the stationary blade or a rearward and slightly raised one 33 of the stationary blades depending upon the height of the vine. The vine is thus cut by the reciprocating action of the tines before the vine can be pulled by the vertical portion of the tine which could cause ripping of the plant.

Rearwardly of the tines is provided the roller 13. The roller 13 extends across the full width of the tines and is mounted on an axle 36 carrying a pair of side plates 37. The side plates are each mounted on a respective one of a pair of vertical shafts 38 mounted for sliding movement in support blocks 39 and 40. The height of the roller 13 can thus be adjusted simply by sliding the shaft 38 in a vertical direction to vary the height of the tines relative to the roller. The picking system including the tines and the rollers is mounted upon a float system so that the weight of the picking system rests generally upon the roller with a tine supported above the ground to the adjustable distance as set by the adjustment of the shaft 38. The roller is positioned immediately rearwardly of the vertical portion of the tines so that it is as close as possible to the forward portion of the ties where the vine is graspsed to prevent excessive pulling or bunching of the vine. In addition the location of the tine relative to the roller allows the forward portion of the tine to be moved downwardly of the roller to a position close to the ground to accommodate low lying vines.

To prevent sideways tilting of the picking system to an extent sufficient to engage the tines into the ground, there are provided two side wheels 41 and 42 each mounted on a vertical shaft 43 carried by a frame member 44. The interconnection between the frame member 44 and the picking system is not shown as this will be apparent to one skilled in the art. The side wheels 41 and 42 are not intended to rest upon the ground during normal action but simply engage the ground in the event that the ground is raised on one side of the picking system so as to lift that side of the picking system to prevent the tines from engaging into the ground.

The suction duct 11 is tubular including a front wall 50 which is substantially vertical, a substantially parallel rear wall 51 and two end walls 52. A tubular duct extends downwardly to an open mouth 53 just above the upper surface of the tines. The open mouth is defined by a bottom edge 54 of the front wall 50 and a raised bottom edge 55 of the rear wall 51. This maintains the bottom edge spaced at substantially constant distance from the upper surface of the tines. A sliding portion 56 of the tubular duct allows the lower portion of the duct to be maintained at a constant distance from the tines and thus movable in a floating action with the picking system while an upper portion of the duct remains fixed to the machine.

At each end of the duct at each end wall 52 is provided a cutting disc 57 mounted on the outside surface of the wall 52. The cutting disc is mounted on a transverse shaft 58 which is driven by a drive system (not shown) to rotate the shaft and thus the cutting disc about the longitudinal axis of the shaft. The cutting disc includes a cutout portion 59 defining a radial cutting edge 60 which cooperates with the lower edge of the side wall 52 in a scissors action. Thus any vine which extends across the full width of the duct is swept into the path of the cutting edge 60 by the forward movement of the picking system and is thus cut by the scissors action between the cutting edge 60 and the bottom edge of the side wall 52.

In the picking action, therefore, the longitudinal vines which are the ones which tend to carry the berries sweep between the forwardly projecting finger portions of the tines and the dancing action caused by the oscillating movement of the alternate tines causes the berries to be stripped upwardly from the vines as the vines move downwardly through the tines. The roller 13 pinches the vines to the ground and thus holds the vines to strip the berries between the tines. The berries thus tend to sit on the upper surface of the forward portion 19 and on the front part of the curved portion 18 of the tines. This area is located immediately below the duct 11 so that a suction system 62 of the system act to draw the berries upwardly from the upper surface of the tine into the duct for transportation to the suction and collection system 62.

Transverse vines which tend to be ones that require pruning slide into engagement with the stationary blades and are cut without pulling so they can fall back on either side of the stationary blade between the tines. Any long vines which extend across the full width of the suction duct are cut by the end discs 57 so that the cut portion of the vine can be drawn upwardly into the suction duct with the berries.

In order to assist movement of the berries, there is provided at a front part of the suction duct 11 an air jet system 65 including an air jet duct 66 defined between a front surface of the front wall 50 and a formed sheet metal wall 67 carried thereby. The air jet duct 65 is connected to a suitable source of air under pressure (not shown) which generates an air flow into the duct and through three output orifices 68, 69 and 70. The orifices are in the form of slots or a plurality of transversely spaced holes which generate a curtain of air across the full width of the tine system. It will be noted from FIG. 1 that the orifices 68 and 69 are arranged to generate an air jet 71, 72 extending upwardly of the suction duct partway along the suction duct so as to assist air movement vertically upwardly of the suction duct. The nozzle 70, however, is arranged just forwardly of the front edge 54 of the front wall 50 and is directed therefrom downwardly and rearwardly toward the curve portion 18 of the tines. This air jet orifice 70 generates an air jet 74 tending to sweep berries on the tines rearwardly away from the front nose 20 of the tines. It has been found in practice that movement of vines and berries across the nose 20 generally tends to keep the berries in position rearwardly of the nose so that they are in a position to be drawn away by the suction effect. However in cases where the vine has a bare patch so that there is no continuing movement rearwardly onto the tines at that bare patch, there is a tendency for the berries to roll forwardly and to be lost onto the bare patch rather than enter the suction duct for collection. The additional air jet 74 therefore tends to push the berries back onto the tines to hold those berries in position long enough to be drawn away by the suction duct for collection.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said means mounting the tines being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tine to lift the berries from the tines for transportation to collection means, each tine including a substantially vertical portion extending upwardly from said rearward portion and substantially at right angles to said generally horizontal forward portion.

2. The harvester according to claim 1 wherein the cam means is arranged for engagement with said vertical portion of each tine to generate movement in a substantially horizontal direction to move each tine forwardly and rearwardly.

3. The harvester according to claim 2 wherein said roller is arranged immediately behind the tines and wherein the vertical portion of each tine is positioned forwardly of the roller to allow the forward portion of each tine to extend closely to the ground in front of the roller.

4. The harvester according to claim 2 wherein the tines are mounted for pivotal movement about a horizontal axis transverse to the direction of working movement, the horizontal axis being arranged at the vertical portions of the tines.

5. The harvester according to claim 4 wherein the cam means is arranged downwardly of said horizontal pivot axis and rearwardly of the vertical portions of the tines and wherein there is provided spring means biasing the tines into engagement with the cam means.

6. The harvester according to claim 1 including a plurality of stationary blade members, each arranged to cooperate with a respective one of the tines such that movement of the respective tine causes a cutting action of the blade relative to the tine for cutting vines lying across the tine.

7. The harvester according to claim 6 wherein each tine includes a slot therethrough lying in the plane of movement of the tine and wherein the stationary blade member projects through the slot.

8. The harvester according to claim 6 wherein the stationary blade member is hook shaped so as to include a hook member at an upper end thereof projecting above the tine, the tine being arranged to move toward the hook member so as to trap a vine between an undersurface of the hook member and an upper surface of the tine.

9. The harvester according to claim 8 wherein the hook member includes a surface which is inclined downwardly and forwardly such that forward movement of the tine pushes a vine into engagement with the inclined surface.

10. The harvester according to claim 6 wherein the stationary blade members are arranged in two rows forwardly and rearwardly such that the blade members of alternate ones of the tines are arranged forwardly of the blade members of intervening ones of the tines.

11. The harvester according to claim 6 wherein the stationary blade members are mounted on a support beam arranged rearwardly of the tines such that each blade member extends downwardly and forwardly from the beam to a position cooperating with the respective tine.

12. The harvester according to claim 6 including a pair of end cutters each arranged at a respective end of the row of tines for cutting vines lying across the row of tines.

13. The harvester according to claim 12 wherein each end cutter comprises a planar blade member mounted in a vertical plane parallel to the direction of working movement and rotatable about an axis transverse to the direction of working movement, the blade having a cutout portion with a blade edge defined substantially radially of the axis.

14. The harvester according to claim 1 wherein the suction duct means include a tubular suction duct arranged vertically above the forward portion of the tines and extending upwardly therefrom and an air-jet nozzle arranged on the suction duct at an open mouth thereof above the forward portion, the air-jet nozzle being arranged to generate an air jet directed downwardly and rearwardly onto the forward portion of the tine.

15. A harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said means mounting the tines being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tine to lift the berries from the tines for transportation to collection means, and a plurality of stationary blade members, each arranged to cooperate with a respective one of the tines such that movement of the respective tine causes a cutting action of the blade relative to the tine for cutting vines lying across the tine.

16. The harvester according to claim 15 wherein each tine includes a slot therethrough lying in the plane of movement of the tine and wherein the stationary blade member projects through the slot.

17. The harvester according to claim 15 wherein the stationary blade member is hook shaped so as to include a hook member at an upper end thereof projecting above the tine, the tine being arranged to move toward the hook member so as to trap a vine between an undersurface of the hook member and an upper surface of the tine.

18. The harvester according to claim 17 wherein the hook member includes a surface which is inclined downwardly and forwardly such that forward movement of the tine pushes a vine into engagement with the inclined surface.

19. A harvester for small fruit berries of a type such as cranberries which grow on vines across the ground, the harvester comprising a plurality of tines, means mounting the tines arranged side by side in a row transversely of a direction of working movement of the harvester for engaging the vines as the tines are moved forwardly along the direction of working movement, each tine including a generally horizontal forwardly extending end portion and an upwardly curved rear portion rearwardly of the forward portion, a ground roller, means mounting the ground roller rearwardly of the tines for rolling on the vines behind the tines, said means mounting the tines being arranged to allow reciprocating movement of each tine in a vertical plane longitudinally of the direction of movement, cam means for actuating reciprocating movement of the tines such that alternate tines are arranged to move out of phase to lift the berries from the vines, suction duct means arranged above the tine to lift the berries from the tines for transportation to collection means, wherein the suction duct means include a tubular suction duct having an open mouth arranged vertically above the forward portion of the tines with the duct extending upwardly therefrom, and an air-jet nozzle arranged at the open mouth above the forward portion of the tines, the air-jet nozzle being arranged to generate an air jet directed downwardly and rearwardly onto the forward portion of the tines.

* * * * *